(12) United States Patent
Katano

(10) Patent No.: US 11,441,732 B2
(45) Date of Patent: Sep. 13, 2022

(54) MANUFACTURING METHOD FOR HIGH-PRESSURE TANK AND HIGH-PRESSURE TANK

(71) Applicant: TOYOTA JIDOSHA KABUSHIKI KAISHA, Toyota (JP)

(72) Inventor: Koji Katano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 10 days.

(21) Appl. No.: 17/068,330

(22) Filed: Oct. 12, 2020

(65) Prior Publication Data

US 2021/0222830 A1 Jul. 22, 2021

(30) Foreign Application Priority Data

Jan. 17, 2020 (JP) .............................. JP2020-005585

(51) Int. Cl.
*F17C 1/06* (2006.01)

(52) U.S. Cl.
CPC ........ *F17C 1/06* (2013.01); *F17C 2201/0109* (2013.01); *F17C 2203/012* (2013.01); *F17C 2203/0604* (2013.01); *F17C 2203/0621* (2013.01); *F17C 2203/0663* (2013.01); *F17C 2209/2154* (2013.01)

(58) Field of Classification Search
CPC ...... F17C 2203/0663; F17C 2203/0673; F17C 2203/068; F17C 2203/0685; F17C 2203/069; F17C 2209/21; F17C 2209/2109; F17C 2209/2118; F17C 2209/22; F17C 2209/221; F17C 2209/232; F17C 2203/06; F17C 2203/0602; F17C 2203/0612; F17C 1/06; F17C 2201/0109; F17C 2203/012; F17C 2203/0604; F17C 2203/0621; F17C 2203/0619; F17C 2205/0305; F17C 2223/033; F17C 1/16; F17C 2203/066; F17C 2221/012; F17C 2221/033

See application file for complete search history.

(56) References Cited

U.S. PATENT DOCUMENTS

| | | | | |
|---|---|---|---|---|
| 2011/0210127 A1* | 9/2011 | Strack | ...................... | F16J 12/00 220/586 |
| 2017/0246794 A1* | 8/2017 | Cola | .................... | B29C 65/7847 |
| 2020/0332960 A1* | 10/2020 | Sato | .................... | B29C 66/1142 |
| 2021/0156516 A1* | 5/2021 | Kampf | .................... | E03B 11/12 |

FOREIGN PATENT DOCUMENTS

| | | |
|---|---|---|
| JP | 2012-149739 A | 8/2012 |
| JP | 2016-141092 A | 8/2016 |

\* cited by examiner

*Primary Examiner* — Don M Anderson
(74) *Attorney, Agent, or Firm* — Finnegan, Henderson, Farabow, Garrett & Dunner, LLP

(57) ABSTRACT

A high-pressure tank includes a liner, a first reinforcing layer covering an outer surface of the liner, and a second reinforcing layer covering an outer surface of the first reinforcing layer. The first reinforcing layer is formed as a cylindrical member, a valve-side dome member, and an end-side dome member are fitted to each other in a state where resin intervening members are arranged between these members neighboring each other, respectively. The resin intervening member is formed into a ring shape.

3 Claims, 8 Drawing Sheets

MANUFACTURING METHOD FOR HIGH-PRESSURE TANK AND HIGH-PRESSURE TANK

CROSS-REFERENCE TO RELATED APPLICATION

This application claims priority to Japanese Patent Application No. 2020-005585 filed on Jan. 17, 2020, incorporated herein by reference in its entirety.

BACKGROUND

1. Technical Field

The disclosure relates to a manufacturing method for a high-pressure tank and a high-pressure tank.

2. Description of Related Art

As a high-pressure tank such as a hydrogen tank mounted on a fuel-cell vehicle or a hydrogen vehicle, there is known a tank that includes an almost cylindrical liner, and a reinforcing layer that covers an outer surface of the liner and is made from a fiber reinforced resin material. As described in Japanese Unexamined Patent Application Publication No. 2012-149739 (JP 2012-149739 A), such a high-pressure tank is manufactured as a plurality of fiber bundles made from a fiber reinforced resin material is wound around an outer surface of a liner by a filament winding method (a FW method) so that a reinforcing layer is formed.

SUMMARY

Recently, a manufacturing method has been considered in which split bodies fabricated with use of molds are joined to each other so that a reinforcing layer is formed, and then a resin material is poured into the formed reinforcing layer so that a liner is formed. With this manufacturing method, winding of the fiber bundles around the liner like the related art is no longer necessary. Therefore, the liner does not need to have a function of a winding core, and it is thus possible to reduce a weight of the liner. However, when this manufacturing method is used, misalignment of the split bodies is likely to happen when the split bodies are conveyed, and a gap may be made between the split bodies.

The disclosure has been accomplished in order to resolve this technical problem, and an object of the disclosure is to provide a manufacturing method for a high-pressure tank and the high-pressure tank in which misalignment of split bodies is prevented.

A manufacturing method for a gas high-pressure tank according to the disclosure is a manufacturing method for a high-pressure tank provided with a reinforcing layer that is formed as a plurality of split bodies is fitted to each other. The manufacturing method includes a first step, a second step, and a third step. In the first step, a fitted body is fabricated as the split bodies are fitted to each other in a state where a resin intervening member is arranged between the neighboring split bodies. In the second step, a fiber bundle impregnated with thermosetting resin is wound around an outer surface of the fitted body. In the third step, the resin in the fiber bundle wound around the fitted body is thermally cured.

With the manufacturing method for the high-pressure tank according to the disclosure, the fitted body is fabricated as the split bodies are fitted to each other in the state where the resin intervening member is arranged between the neighboring split bodies. Therefore, the resin intervening member is able to prevent misalignment between the neighboring split bodies.

In the manufacturing method for the high-pressure tank according to the disclosure, the resin intervening member may include at least a first part sandwiched between the neighboring split bodies. Thus, it is possible to reduce an amount of material used for the resin intervening member while the resin intervening member plays a role of preventing misalignment between the neighboring split bodies. Therefore, a cost reduction for the resin intervening member is achieved.

In the manufacturing method for the high-pressure tank according to the disclosure, the resin intervening member may further include a second part as well as the first part. The second part covers at least either one of end portions of the split bodies that are fitted to each other. Thus, it is possible to protect the end portions of the split bodies that are fitted to each other.

In the manufacturing method for the high-pressure tank according to the disclosure, the resin intervening member may be formed into a ring shape. Thus, the resin intervening member is able to play a role of a seal member as well as a role of preventing misalignment between the neighboring split bodies. Therefore, for example, when a resin material is poured inside the fitted body to form a liner, the resin material is prevented from flowing into a gap between the split bodies.

In the manufacturing method for the high-pressure tank according to the disclosure, the resin intervening member may be formed with use of a resin material that does not contain fiber. Thus, the resin intervening member is easily stretched, and is thus able to fit suitably the gap between the split bodies. Therefore, misalignment between the split bodies is prevented more reliably.

A high-pressure tank according to the disclosure is a high-pressure tank that includes a liner that stores gas, a first reinforcing layer, and a second reinforcing layer. The first reinforcing layer covers an outer surface of the liner and is formed as a plurality of split bodies is fitted to each other. The second reinforcing layer covers an outer surface of the first reinforcing layer. The split bodies are fitted to each other in a state where a resin intervening member is arranged between the neighboring split bodies.

With the high-pressure tank according to the disclosure, the split bodies that form the first reinforcing layer are fitted to each other in the state where the resin intervening member is arranged between the neighboring split bodies. With the resin intervening member, it is possible to prevent misalignment between the neighboring split bodies.

According to the disclosure, it is possible to prevent misalignment between the split bodies.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a high-pressure tank and a manufacturing method thereof is described with reference to the drawings. In this embodiment, a high-pressure tank 10 is described as an example of a high-pressure tank that is mounted on a fuel-cell vehicle and filled with high-pressure hydrogen gas. However, the high-pressure tank may also be applied for other purposes. Gas that can be filled in the high-pressure tank 10 is not limited to high-pressure hydrogen gas.

Figure 1:
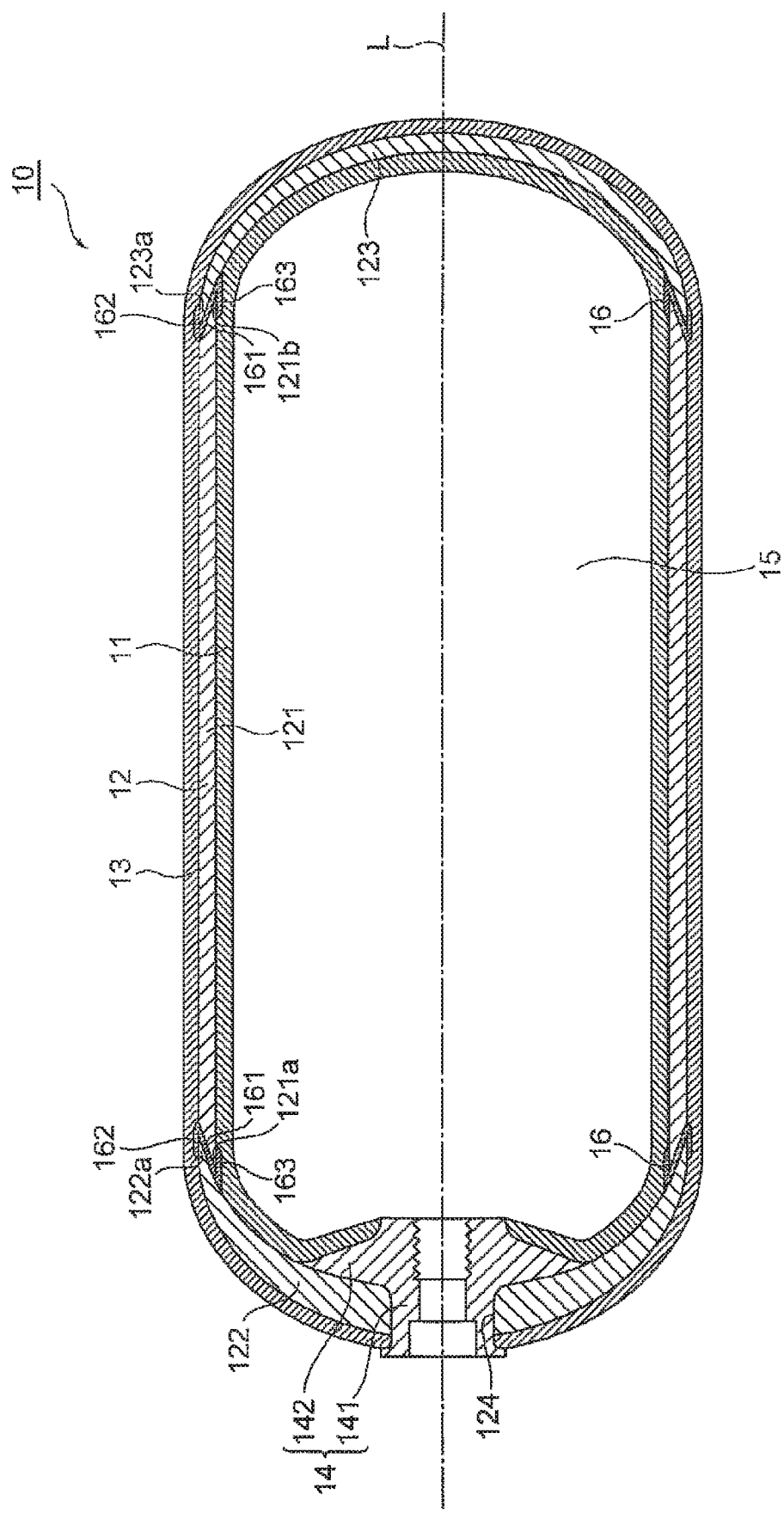
FIG. 1 is a schematic sectional view showing a structure of a high-pressure tank.
Figure 2:
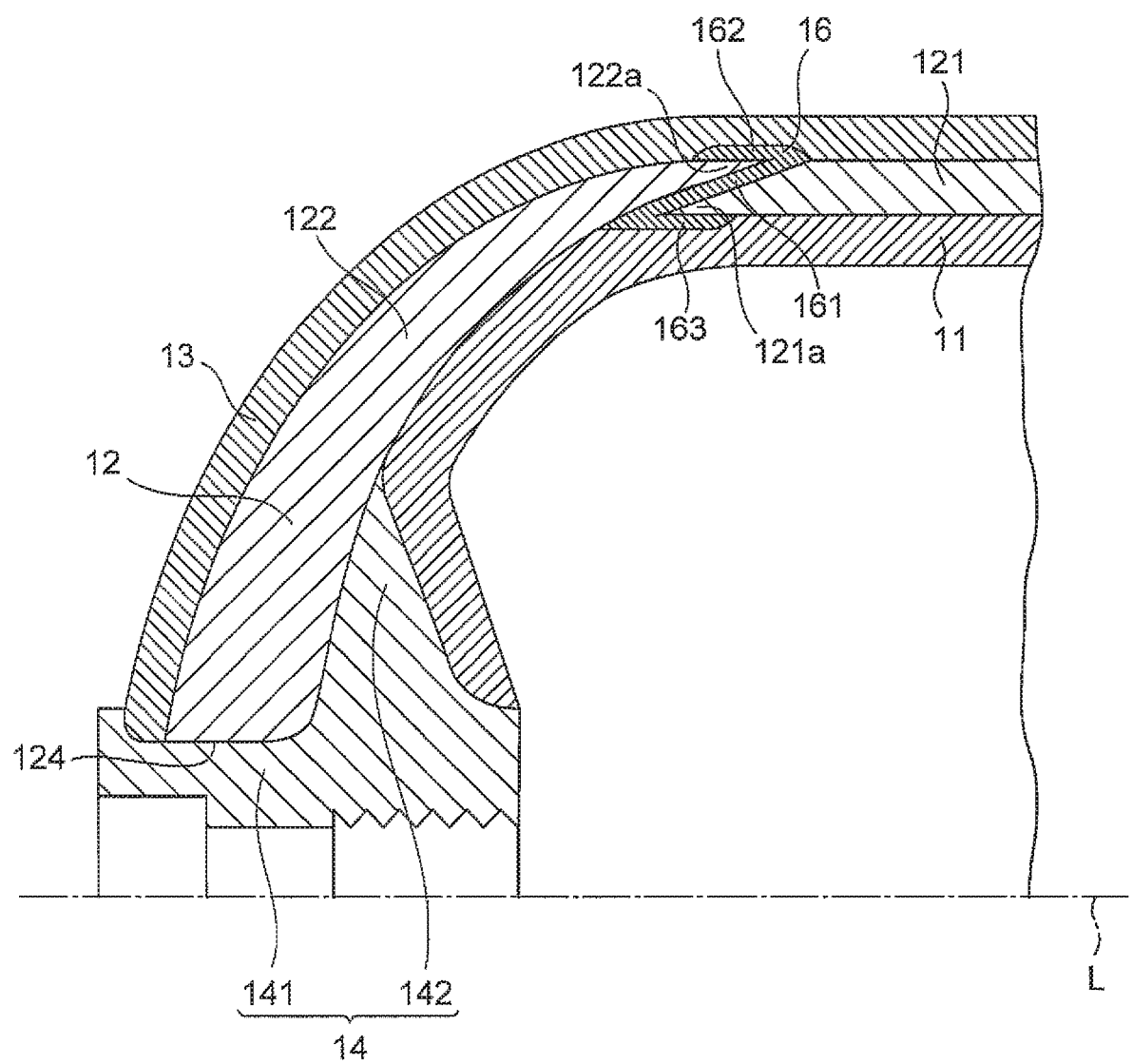
FIG. 2 is an enlarged sectional view showing the structure of the high-pressure tank.

FIG. 1 is a schematic sectional view showing a structure of the high-pressure tank, and FIG. 2 is an enlarged sectional view showing the structure of the high-pressure tank. The high-pressure tank 10 is an almost cylindrical high-pressure gas storage container having both ends rounded like domes. The high-pressure tank 10 includes a liner 11 having a gas barrier property, a first reinforcing layer 12, and a second reinforcing layer 13. The first reinforcing layer 12 covers an outer surface of the liner 11 and is made from a fiber reinforced resin material. The second reinforcing layer 13 covers an outer surface of the first reinforcing layer 12 and is made from a fiber reinforced resin material.

A circular opening 124 is formed in a first end of the high-pressure tank 10 in an axis L direction, and an almost cylindrical cap 14 is fitted into the opening 124. A valve (not shown) for filling and discharging hydrogen gas is attached to the cap 14. Meanwhile, no opening is made in a second end of the high-pressure tank 10 in the axis L direction, and no cap is provided either. Hereinafter, a side where the cap 14 is fitted is referred to as a "valve side", and a side where no cap is provided is referred to as an "end side".

The liner 11 is formed along an inner surface of the first reinforcing layer 12. The liner 11 is a resin member that forms a storage space 15 filled with high-pressure hydrogen gas. It is preferred that the resin that configures the liner 11 is resin that has an excellent performance of holding gas to be filled (hydrogen gas in this case) inside the storage space 15, in other words, an excellent gas barrier property. This kind of resin may be, for example, thermoplastic resin such as polyamide, polyethylene, ethylene-vinyl alcohol copolymer (EVOH), and polyester, or thermosetting resin such as epoxy. As fuel gas, the storage space 15 of the liner 11 may be filled with not only hydrogen gas, but also, for example, various types of compressed gas such as compressed natural gas (CNG), various types of liquefied gas such as liquefied natural gas (LNG) and liquefied petroleum gas (LPG), and other types of gas.

The cap 14 is made as a metal material such as stainless steel and aluminum is formed into a given shape. The cap 14 has an almost cylindrical cap body 141, and a flange portion 142 that is fitted between the liner 11 and a valve-side dome member 122 (described later) of the first reinforcing layer 12.

The first reinforcing layer 12 covers the outer surface of the liner 11, and also has a function of reinforcing the liner 11 so that mechanical strength such as rigidity and pressure resistance of the high-pressure tank 10 is improved. The first reinforcing layer 12 is formed as a plurality of split bodies is fitted to each other. In this embodiment, the first reinforcing layer 12 is made as a single body as the three split bodies (that are a cylindrical member 121, the valve-side dome member 122, and an end-side dome member 123) are fitted to each other in a state where a resin intervening member 16 is arranged between the neighboring split bodies.

More specifically, a valve-side fitting end portion 121*a* and an end-side fitting end portion 121*b* of the cylindrical member 121 are formed into a tapered shape so that their thicknesses are reduced gradually from an outer side towards an inner side of the high-pressure tank 10. A fitting end portion 122*a* of the valve-side dome member 122 fitted to the valve-side fitting end portion 121*a* of the cylindrical member 121, and a fitting end portion 123*a* of the end-side dome member 123 fitted to the end-side fitting end portion 121*b* are formed into a tapered shape so that their thicknesses are gradually reduced from the inner side towards the outer side of the high-pressure tank 10.

Then, the valve-side dome member 122 and the cylindrical member 121 are fitted to each other in a state where the fitting end portion 122*a* is positioned on the outer side and the valve-side fitting end portion 121*a* is positioned on the inner side. The resin intervening member 16 is arranged between the fitting end portion 122*a* and the valve-side fitting end portion 121*a*. The resin intervening member 16 has a Z-shaped section, and includes a first part 161, a second part 162, and a second part 163. The first part 161 is sandwiched between the fitting end portion 122*a* and the valve-side fitting end portion 121*a*. The second part 162 covers the fitting end portion 122*a* together with the first part 161. The second part 163 covers the valve-side fitting end portion 121*a* together with the first part 161.

Meanwhile, the end-side dome member 123 and the cylindrical member 121 are fitted to each other in a state where the fitting end portion 123*a* is positioned on the outer side, and the end-side fitting end portion 121*b* is positioned on the inner side. The resin intervening member 16 described above is arranged between the fitting end portion 123*a* and the end-side fitting end portion 121*b*. The resin intervening member 16 is arranged so that the first part 161 is sandwiched between the fitting end portion 123*a* and the end-side fitting end portion 121*b*, the second part 162 covers the fitting end portion 123*a* together with the first part 161, and the second part 163 covers the end-side fitting end portion 121*b* together with the first part 161.

The resin intervening member 16 has a ring shape so as to fit a circumference of the cylindrical member 121. The resin intervening member 16 is formed by injection molding with use of, for example, a thermoplastic resin material. The thermoplastic resin material includes, for example, polyamide (PA), polyphenylene sulfide (PPS), polyetheretherketone (PEEK), and so on. Further, it is preferred that the thermoplastic resin material used for the resin intervening member 16 has high heat resistance (for example, the resin that does not melt even at 160° C. that is thermosetting temperature). Thus, it is possible to maintain the shape of the resin intervening member 16 even when the resin is thermally cured.

Further, the thermoplastic resin material may or may not contain fiber such as carbon fiber (in other words, may or may not be reinforced by fiber). When the resin does not contain fiber, the resin intervening member 16 is stretched easily and is thus able to fit suitably a gap between the fitting end portions, and misalignment of the fitting members is prevented reliably.

The first reinforcing layer 12 that is formed as the valve-side dome member 122, the cylindrical member 121, and the end-side dome member 123 are fitted to each other is made from resin and fiber (continuous fiber). In the cylindrical member 121, the fiber is formed along circumferentially at an angle almost orthogonal to the axis L direction of the cylindrical member 121. In other words, in the cylindrical member 121, the fiber is oriented in a circumferential direction of the cylindrical member 121. Because the fiber is oriented in the circumferential direction in the cylindrical member 121, strength of the first reinforcing layer 12 against hoop stress generated by inner pressure (gas pressure) is ensured because of an adequate amount of the fiber reinforcing resin.

Meanwhile, in the valve-side dome member 122 and the end-side dome member 123, the fiber is not oriented in the circumferential direction of the cylindrical member 121, and the fibers extending in various directions that intersect the circumferential direction are arranged so as to overlap each other. Thus, with the valve-side dome member 122 and the end-side dome member 123, strength of the first reinforcing layer 12 against stress generated by inner pressure (gas pressure) is ensured because of the adequate amount of the fiber reinforcing resin.

In the embodiment, the fiber in the cylindrical member 121 and the fibers in the valve-side dome member 122 and the end-side dome member 123 are not continuous (in other words, they are not linked to each other). This is because, after the cylindrical member 121 and the two dome members (the valve-side dome member 122 and the end-side dome member 123) are formed separately, the valve-side dome member 122 and the end-side dome member 123 are fitted to both end portions of the cylindrical member 121, respectively.

Meanwhile, the second reinforcing layer 13 is formed so as to cover the outer surface of the first reinforcing layer 12. The second reinforcing layer 13 covers the cylindrical member 121, the valve-side dome member 122, and the end-side dome member 123 entirely. The second reinforcing layer 13 is made from resin and fiber (continuous fiber).

In the high-pressure tank 10 configured as above, the valve-side dome member 122, the cylindrical member 121, and the end-side dome member 123 that form the first reinforcing layer 12 are fitted to each other in the state where the resin intervening members 16 are sandwiched between them, respectively. With the resin intervening members 16, it is possible to prevent misalignment between the valve-side dome member 122 and the cylindrical member 121, and misalignment between the cylindrical member 121 and the end-side dome member 123.

Further, since the resin intervening member 16 is formed into a ring shape, the resin intervening members 16 are able to fill the gap between the valve-side dome member 122 and the cylindrical member 121 and the gap between the cylindrical member 121 and the end-side dome member 123, respectively. The resin intervening members 16 are able to play a role of seal members. Therefore, when, for example, the liner 11 is formed as the resin material is poured inside the first reinforcing layer 12, it is possible to prevent the resin material from flowing into the gap between the valve-side dome member 122 and the cylindrical member 121, or the gap between the cylindrical member 121 and the end-side dome member 123.

Further, each of the resin intervening members 16 includes the first part 161, the second part 162, and the second part 163. The first part 161 is sandwiched between the fitting end portion 122a and the valve-side fitting end portion 121a (or between the fitting end portion 123a and the end-side fitting end portion 121b). The second part 162 covers the fitting end portion 122a (or the fitting end portion 123a) together with the first part 161. The second part 163 covers the valve-side fitting end portion 121a (or the end-side fitting end portion 121b) together with the first part 161. Therefore, the resin intervening member 16 is able to protect the fitting end portion 122a and the valve-side fitting end portion 121a (or the fitting end portion 123a and the end-side fitting end portion 121b) while playing roles of preventing misalignment and the seal member.

Figure 3:
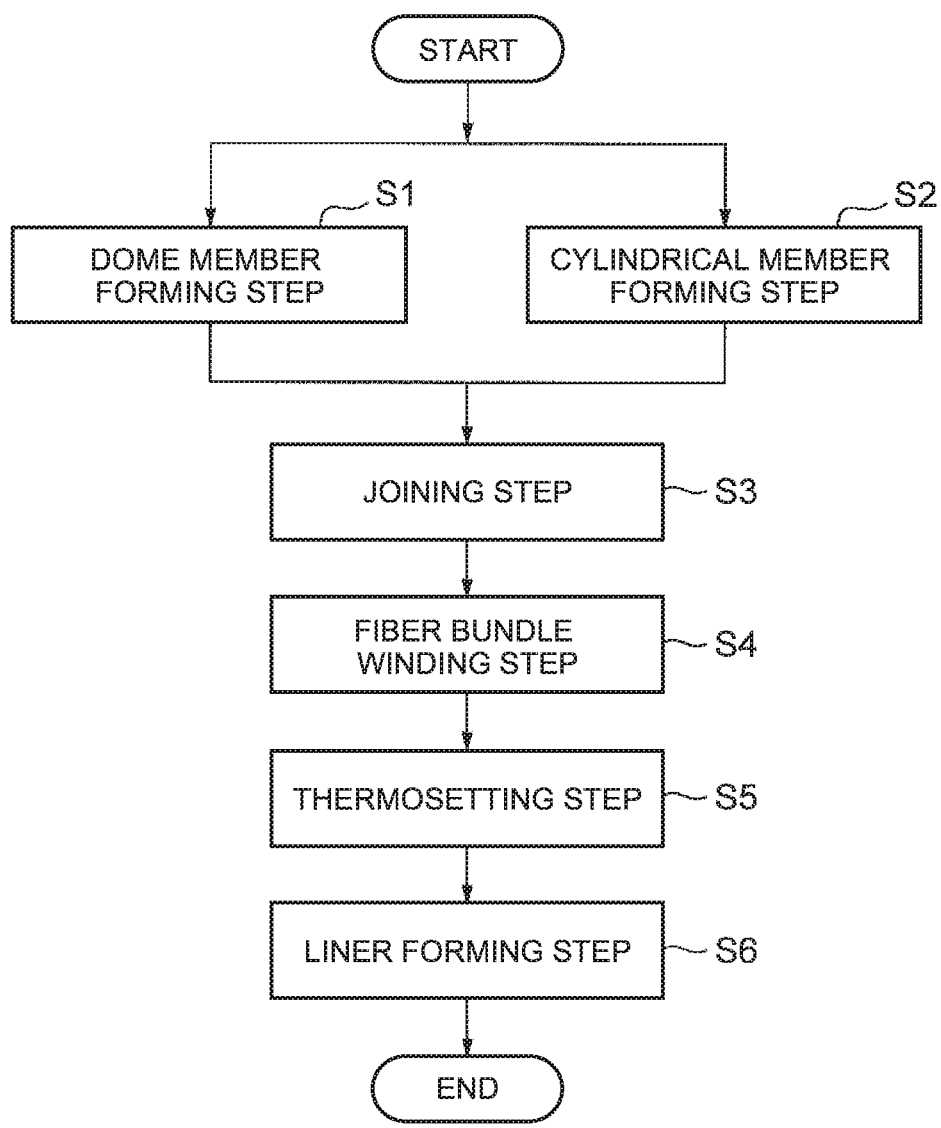
FIG. 3 is a flowchart of a manufacturing method for the high-pressure tank.

Hereinafter, a manufacturing method for the high-pressure tank 10 is described. FIG. 3 is a flowchart of the manufacturing method for the high-pressure tank. The manufacturing method for the high-pressure tank 10 includes a dome member forming step S1, a cylindrical member forming step S2, a joining step S3, a fiber bundle winding step S4, a thermosetting step S5, and a liner forming step S6. Since the dome member forming step S1 and the cylindrical member forming step S2 are steps independent from each other, these steps may be performed simultaneously, and either one of the steps may be performed prior to the other.

In the dome member forming step S1, a wound body is fabricated as resin-impregnated fiber bundle is wound so as to cover an outer surface of a given mold with use of, for example, a filament winding method. Then, after the fabricated wound body is solidified, the wound body is split by a cutter or the like so that the two dome members (the valve-side dome member 122 and the end-side dome member 123) are formed (see FIG. 4). Here, the opening 124 to which the cap 14 is to be attached is provided in the formed valve-side dome member 122.

The resin impregnated in the fiber bundle is not particularly limited. However, thermosetting resin may be used. It is preferred that the thermosetting resin is phenol resin, melamine resin, urea resin, or epoxy resin, and epoxy resin is especially preferred in terms of mechanical strength and so on. Generally, epoxy resin is obtained as prepolymer such as copolymer of bisphenol A and epichlorohydrin, and a curing agent such as polyamine are mixed and thermally cured. Epoxy resin has fluidity in an uncured state, and forms a robust crosslinking structure after being thermally cured. As the resin impregnated in the fiber bundle, thermoplastic resin may also be used. As the thermoplastic resin, polyetheretherketone, polyphenylene sulfide, polyacrytic ester, polyimide, polyamide, or the like may be used.

As fiber that configures the fiber bundle, glass fiber, aramid fiber, boron fiber, carbon fiber, or the like may be used, and it is especially preferred that carbon fiber is used in terms of weight reduction, mechanical strength, and so on.

A method for solidifying the wound body (in other words, solidifying the resin in the fiber bundle) is not particularly limited. However, when the resin in the fiber bundle is the thermosetting resin, the resin may be precured. Conditions for the precuring (temperature and time) are changed depending on a type of the resin in the fiber bundle. However, the conditions are set so that viscosity of resin in the fiber bundle becomes higher than viscosity when the fiber bundle is wound around the given mold (viscosity before precuring). Here, as the precuring, the fiber bundle is cured until the resin in the fiber bundle loses its fluidity. Meanwhile, when the resin in the fiber bundle is the thermoplastic resin, the resin in the fiber bundle may be solidified as the fiber bundle in which the resin has fluidity is cooled.

As the resin in the fiber bundle is solidified, it is possible to restrain deformation of the fiber bundle when the fiber bundle is cut with a cutter or the like (in other words, at the time of splitting). At the same time, it is possible to restrain deformation of the valve-side dome member 122 and the end-side dome member 123 when they are removed from the given mold.

In the cylindrical member forming step S2, for example, a fiber sheet is stuck on an inner surface of a rotating cylindrical mold with use of a centrifugal winding (CW) method. Thus, the cylindrical member 121 is formed. The fiber sheet contains at least fiber oriented in, for example, the circumferential direction of the cylindrical mold. Thus, it is possible to obtain the cylindrical member 121 in which the fiber is oriented in the circumferential direction.

The fiber sheet may be, for example, a so-called unidirection (UD) sheet in which a plurality of fiber bundles arranged in a single direction is braided by a cramping thread, or a fiber sheet in which a plurality of fiber bundles arranged in a single direction is braided with a plurality of fiber bundles intersecting those fiber bundles in, for example, an orthogonal direction. The fiber sheet may be a fiber sheet in which resin is not impregnated in advance, or a fiber sheet in which resin is impregnated in advance.

The resin impregnated in the fiber sheet is not particularly limited. However, for example, thermosetting resin may be used. It is preferred that thermosetting resin such as phenol resin, melamine resin, urea resin, and epoxy resin is used similarly to that for the foregoing fiber bundle, and epoxy resin is especially preferred in terms of mechanical strength and so on.

Fibers that configure the fiber sheet may be, glass fiber, aramid fiber, boron fiber, carbon fiber, and so on similarly to that for the foregoing fiber bundle, and carbon fiber is especially preferred in terms of weight reduction, mechanical strength, and so on.

Figure 4:
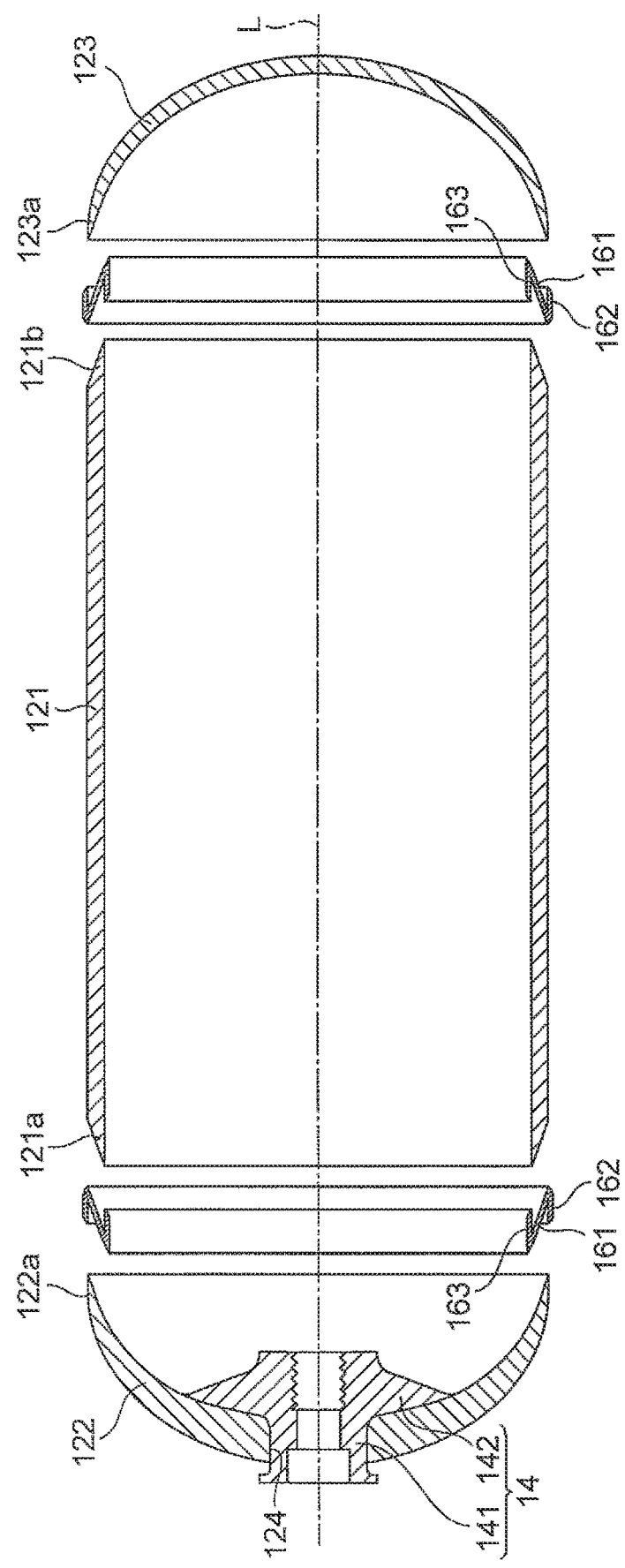
FIG. 4 is a schematic view describing the manufacturing method for the high-pressure tank.

As shown in FIG. 4, the cylindrical member 121 formed on the inner surface of the cylindrical mold is formed so that its thickness is gradually reduced from the inner side towards the outer side in the valve-side fitting end portion 121a and the end-side fitting end portion 121b. Thus, when the cylindrical member 121 and the valve-side dome member 122 or the end-side dome member 123 are fitted and connected to each other, it is unlikely that a level difference is formed in end portions fitted to each other. Thus, it is possible to restrain a void from being formed between the first reinforcing layer 12 and the second reinforcing layer 13 caused by the level difference.

When the resin for the cylindrical member 121 is thermosetting resin (in other words, when the fiber sheet impregnated with thermosetting resin is used), it is necessary to solidify the cylindrical member 121 by precuring of the resin. Conditions for the precuring (temperature and time) change depending on a type of the resin. However, the conditions are set so that viscosity of the resin becomes higher than viscosity when the resin is wound around the cylindrical mold. Here, as the precuring, the fiber sheet is cured until the resin in the fiber sheet loses its fluidity.

As shown in FIG. 4, in the joining step S3, the valve-side dome member 122, the cylindrical member 121, and the end-side dome member 123 are connected to each other so that the first reinforcing layer 12 is formed. Specifically, first of all, the cap 14 is attached to the opening 124 of the valve-side dome member 122. At this time, for example, the cap 14 is inserted into the opening 124 from the inner side of the valve-side dome member 122, and the cap 14 is further inserted until the flange portion 142 of the cap 14 hits the inner side of the valve-side dome member 122.

Next, for example, the fitting end portion 122a of the valve-side dome member 122 is positioned on the outer side, and the valve-side fitting end portion 121a of the cylindrical member 121 is positioned on the inner side. Then, the fitting end portion 122a and the valve-side fitting end portion 121a are fitted to each other in the state where the resin intervening member 16 is arranged between them. At this time, these fitting end portions are fitted to each other so that the first part 161 of the resin intervening member 16 is positioned between the fitting end portion 122a and the valve-side fitting end portion 121a, the second part 162 covers the fitting end portion 122a, and the second part 163 covers the valve-side fitting end portion 121a.

Next, the fitting end portion 123a of the end-side dome member 123 is positioned on the outer side, and the end-side fitting end portion 121b of the cylindrical member 121 is positioned on the inner side. Then, the fitting end portion 123a and the end-side fitting end portion 121b are fitted to each other in the state where the resin intervening member 16 is arranged between them. At this time, these fitting end portions are fitted to each other so that the first part 161 of the resin intervening member 16 is positioned between the fitting end portion 123a and the end-side fitting end portion 121b, the second part 162 covers the fitting end portion 123a, and the second part 163 covers the end-side fitting end portion 121b.

The valve-side fitting end portion 121a and the end-side fitting end portion 121b of the cylindrical member 121, the fitting end portion 122a of the valve-side dome member 122, and the fitting end portion 123a of the end-side dome member 123 are formed into circumferential shapes, respectively. Therefore, the fitting end portion 122a and the fitting end portion 123a come into contact with the entire circumferences of the valve-side fitting end portion 121a and the end-side fitting end portion 121b of the cylindrical member 121 through the ring-shaped resin intervening members 16, respectively.

As described above, the fitted body formed as the valve-side dome member 122, the cylindrical member 121, and the end-side dome member 123 are fitted to each other serves as the first reinforcing layer 12 described above. Next, the first reinforcing layer 12 is conveyed to the fiber bundle winding step S4 that is the next step. During the conveyance, the resin intervening members 16 are arranged between the valve-side dome member 122 and the cylindrical member 121, and between the cylindrical member 121 and the end-side dome member 123, respectively. Therefore, it is possible to prevent misalignment between the valve-side dome member 122 and the cylindrical member 121, and misalignment between the cylindrical member 121 and the end-side dome member 123.

The joining step S3 corresponds to a "first step" described in claims. In the joining step S3, the fitting end portion 122a of the valve-side dome member 122, and the fitting end portion 123a of the end-side dome member 123 may be fitted to and connected to the valve-side fitting end portion 121a and the end-side fitting end portion 121b of the cylindrical member 121, respectively, in the state where the fitting end portion 122a and the fitting end portion 123a are positioned on the inner side, and the valve-side fitting end portion 121a and the end-side fitting end portion 121b are positioned on the outer side.

In the fiber bundle winding step S4, the fiber bundle impregnated with the thermosetting resin is wound by, for example, helical winding on the outer surface of the first reinforcing layer 12 that is formed in the joining step S3 (that is the fitted body of the valve-side dome member 122, the cylindrical member 121, and the end-side dome member 123).

It is preferred that the thermosetting resin used is, for example, phenol resin, melamine resin, urea resin, and epoxy resin, and epoxy resin is especially preferred in terms of mechanical strength and so on. As fiber that configures the fiber bundle, glass fiber, aramid fiber, boron fiber, carbon fiber, and so on may be used, and carbon fiber is especially preferred in terms of weight reduction, mechanical strength, and so on.

The fiber bundle winding step S4 corresponds to a "second step" described in the claims.

In the thermosetting step S5, the first reinforcing layer 12 on which the fiber bundle is wound is conveyed to a curing oven, and heated in the curing oven at, for example, 160° C. for ten minutes, and the resin in the fiber bundle is thus thermally cured. During the conveyance to the curing oven, the resin intervening members 16 are arranged between the valve-side dome member 122 and the cylindrical member 121, and between the cylindrical member 121 and the end-side dome member 123, respectively. Therefore, it is possible to prevent misalignment between the valve-side dome member 122 and the cylindrical member 121, and misalignment between the cylindrical member 121 and the end-side dome member 123.

The thermosetting step S5 corresponds to a "third step" described in the claims.

In the liner forming step S6, after the resin material is poured inside the first reinforcing layer 12, the first reinforcing layer 12 and the second reinforcing layer 13 formed in the foregoing steps are rotated so that the poured resin material covers the inner surface of the first reinforcing layer 12, and then the resin material is solidified. Thus, the liner 11 is formed.

Figure 5:
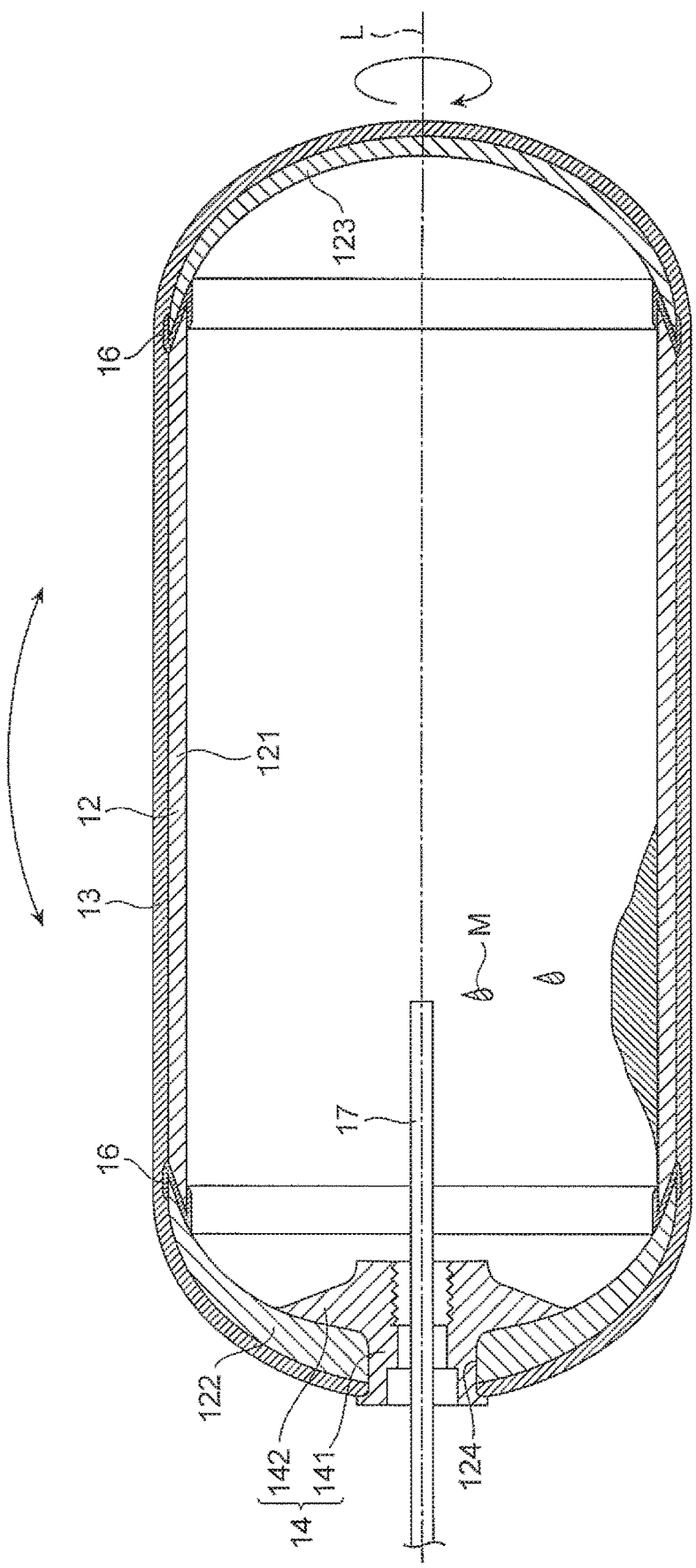
FIG. 5 is a schematic view describing the manufacturing method for the high-pressure tank.

Specifically, as shown in FIG. 5, the first reinforcing layer 12 and the second reinforcing layer 13 to which the cap 14 is attached are arranged horizontally (so that the axis L direction coincides with the horizontal direction), and a nozzle 17 is inserted into the first reinforcing layer 12 through the opening of the cap 14. Next, the fluid resin material M is poured inside the first reinforcing layer 12 through the nozzle 17, and then the nozzle 17 is pulled out from the cap 14. Thereafter, a plug member (not shown) closes the opening of the cap 14.

As described above, it is preferred that the resin material M is resin having an excellent gas barrier property. This kind of resin may be, for example, thermoplastic resin such as polyamide, polyethylene, ethylene-vinyl alcohol copolymer (EVOH), and polyester, or thermosetting resin such as epoxy. However, polyamide is preferred.

Thereafter, the first reinforcing layer 12 and the second reinforcing layer 13 are rotated so that the resin material M covers the inner surface of the first reinforcing layer 12. Specifically, the inner space of the first reinforcing layer 12 is heated to given temperature or higher as necessary, and, in a state where the resin material M has fluidity with low viscosity (0-0.05 Pa·s), the first reinforcing layer 12 and the second reinforcing layer 13 are rotated in a circumferential direction around the axis L, and, at the same time, the valve-side end portion and the end-side end portion of the first reinforcing layer 12 are moved up and down alternately (see an arrow in FIG. 5). Thus, the fluid resin material M is lifted up due to the rotation, and a part of the resin material M flows down along the inner surface of the first reinforcing layer 12 due to its own weight. Thus, the resin material M contacts and covers the entire inner surface of the first reinforcing layer 12.

Next, the resin material M is solidified. In the case where the resin material M is the thermosetting resin, the first reinforcing layer 12 is heated, for example, so that the resin material M is cured, thereby forming the liner 11. Meanwhile, in the case where the resin material M is the thermoplastic resin, temperature of the first reinforcing layer 12 is decreased. Thus, the resin material M is solidified in a state where the resin material M is in contact with and covers the inner surface of the first reinforcing layer 12, thereby forming the liner 11.

With the manufacturing method for the high-pressure tank 10 according to the embodiment, the fitted body is fabricated as the valve-side dome member 122, the cylindrical member 121, and the end-side dome member 123 are fitted to each other in the joining step S3 in the state where the resin intervening members 16 are arranged between the valve-side dome member 122 and the cylindrical member 121, and between the cylindrical member 121 and the end-side dome member 123, respectively. With the resin intervening members 16, it is possible to prevent misalignment between the valve-side dome member 122 and the cylindrical member 121, and misalignment between the cylindrical member 121 and the end-side dome member 123. Therefore, for example, it is possible to prevent misalignment from happening reliably even when the fitted body is conveyed.

Further, because the resin intervening members 16 are formed into a ring shape, the gap between the valve-side dome member 122 and the cylindrical member 121, and the gap between the cylindrical member 121 and the end-side dome member 123 are filled with the resin intervening members 16, respectively. Because the resin intervening members 16 are able to play the role of seal members, the resin intervening members 16 are able to prevent the resin material M from flowing into the gap between the valve-side dome member 122 and the cylindrical member 121, and the gap between the cylindrical member 121 and the end-side dome member 123 when the resin material M is poured inside the first reinforcing layer 12 to form the liner 11.

Further, the resin intervening member 16 includes the first part 161 sandwiched between the fitting end portion 122a and the valve-side fitting end portion 121a (or between the fitting end portion 123a and the end-side fitting end portion 121b), the second part 162 that covers the fitting end portion 122a (or the fitting end portion 123a) together with the first part 161, and the second part 163 that covers the valve-side fitting end portion 121a (or the end-side fitting end portion 121b) together with the first part 161. Therefore, the resin intervening member 16 is able to protect the fitting end portion 122a and the valve-side fitting end portion 121a (or the fitting end portion 123a and the end-side fitting end portion 121b) while playing the roles of preventing misalignment and the seal member.

Figure 6:
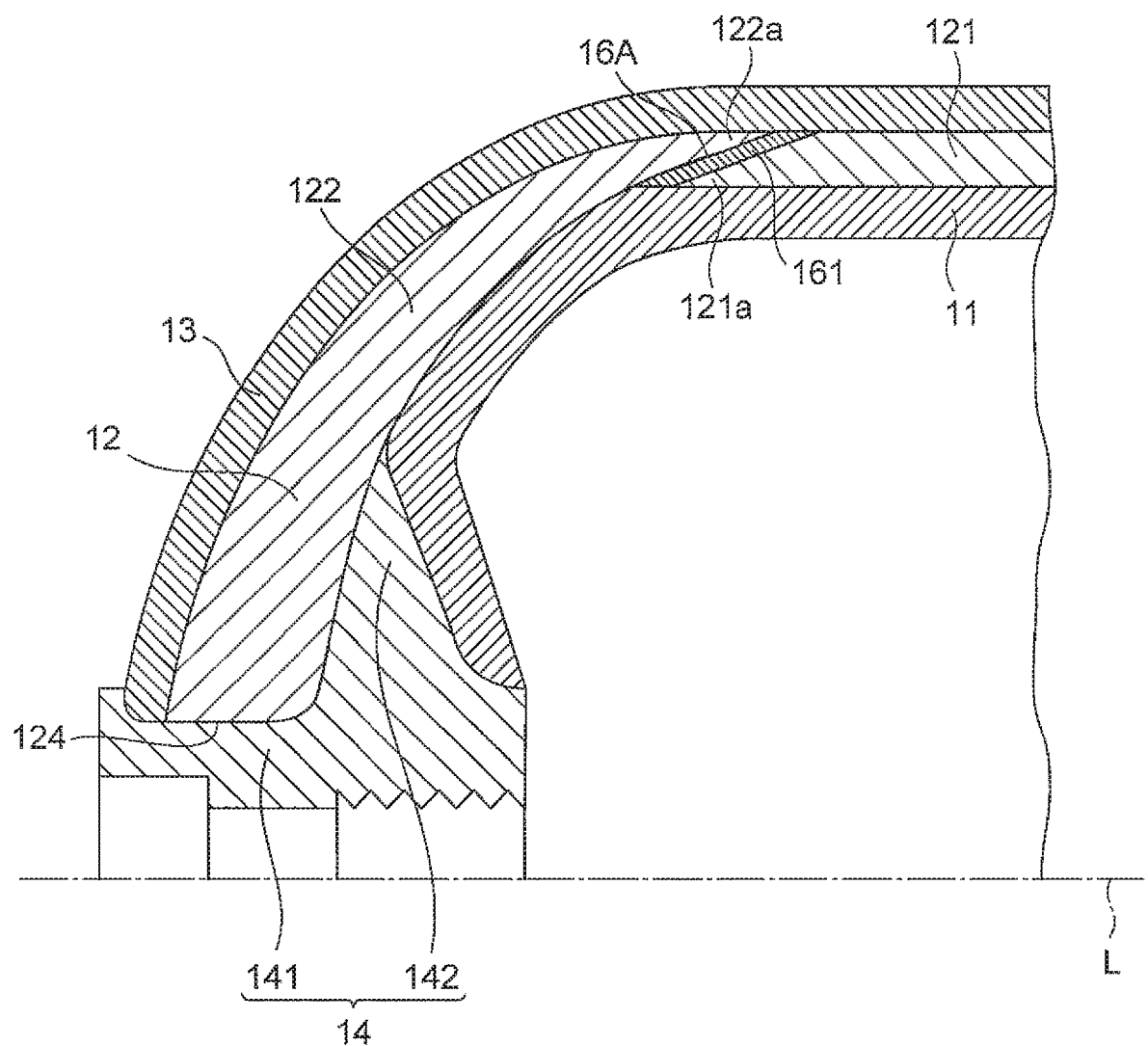
FIG. 6 is a schematic sectional view showing a modification of a resin intervening member of the high-pressure tank.

Various modifications for the resin intervening member of the high-pressure tank 10 can be considered. For example, in a modification shown in FIG. 6, a resin intervening member 16A only has the first part 161 sandwiched between the fitting end portion 122a of the valve-side dome member 122 and the valve-side fitting end portion 121a of the cylindrical member 121. Since the resin intervening member 16A does not include the second parts 162, 163 unlike the resin intervening member 16, it is possible to reduce cost.

Figure 7:
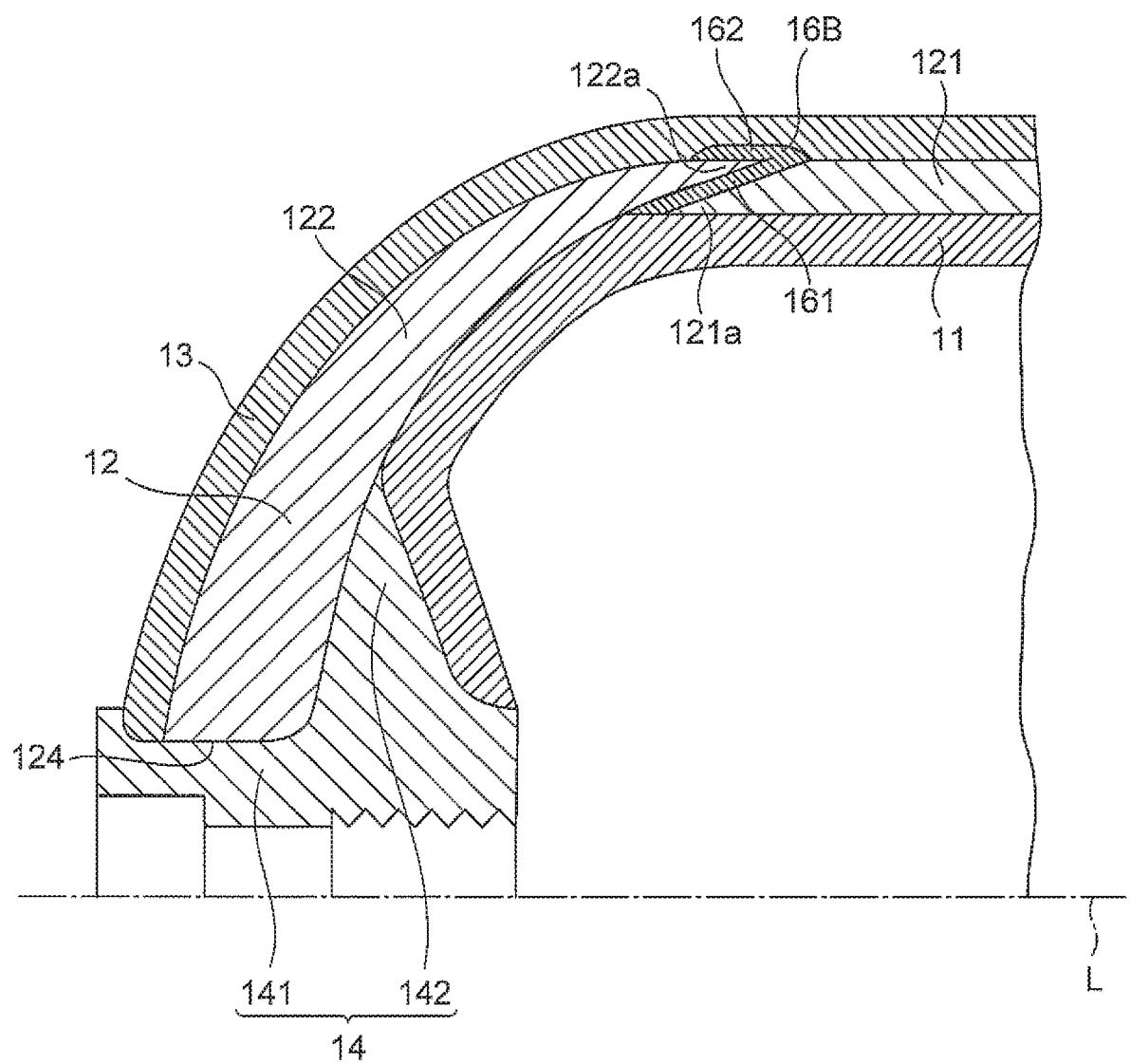
FIG. 7 is a schematic sectional view showing a modification of the resin intervening member of the high-pressure tank.

Also, in a modification shown in FIG. 7, a resin intervening member 16B includes the first part 161 and the second part 162. The first part 161 is sandwiched between the fitting end portion 122a of the valve-side dome member 122 and the valve-side fitting end portion 121a of the cylindrical member 121. The second part 162 covers the fitting end portion 122a together with the first part 161.

Figure 8:
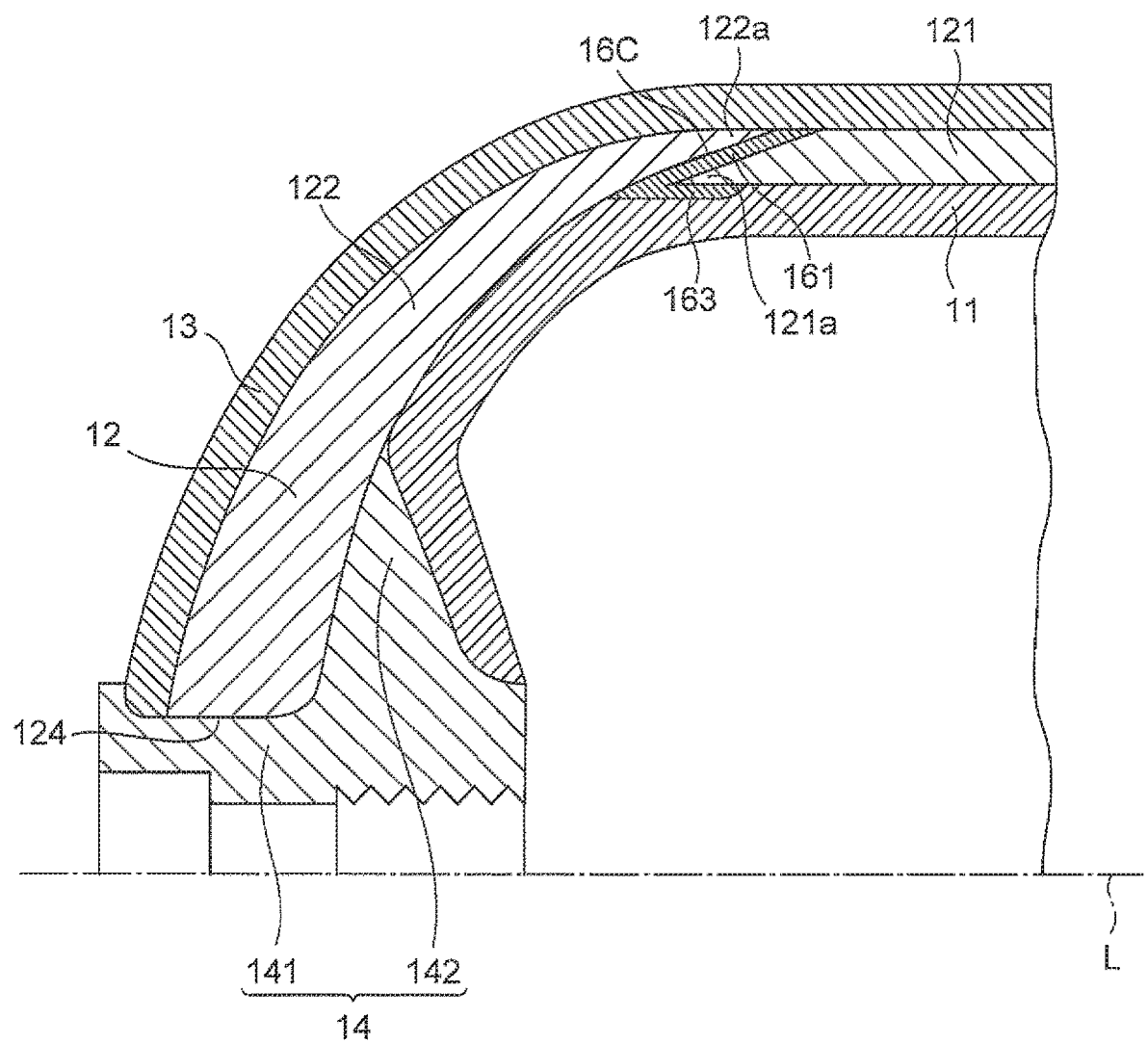
FIG. 8 is a schematic sectional view showing a modification of the resin intervening member of the high-pressure tank.

Further, in a modification shown in FIG. 8, a resin intervening member 16C includes the first part 161 and the second part 163. The first part 161 is sandwiched between the fitting end portion 122a of the valve-side dome member 122 and the valve-side fitting end portion 121a of the cylindrical member 121. The second part 163 covers the valve-side fitting end portion 121a together with the first part 161.

The embodiment of the disclosure has been described in detail. However, the disclosure is not limited to the foregoing embodiment, and various design changes may be made without departing from the spirit of the disclosure described in the claims.

For example, in the foregoing embodiment, the resin intervening member is formed into the ring shape. However, the resin intervening member is not limited to those having the ring shape, and may be formed into, for example, a block shape having a given length. In this case, as the resin intervening members are arranged intermittently and evenly along the circumferential direction between the fitting end portion 122a and the valve-side fitting end portion 121a (or between the fitting end portion 123a and the end-side fitting end portion 121b), misalignment between the members is prevented.

What is claimed is:

1. A high-pressure tank including a liner that stores gas, a first reinforcing layer that covers an outer surface of the liner and is formed as a plurality of split bodies fitted to each other, and a second reinforcing layer that covers an outer surface of the first reinforcing layer, wherein
    the split bodies are fitted to each other in a state where a resin intervening member is arranged between the neighboring split bodies;
    the plurality of split bodies are a cylindrical member, a valve-side dome member and an end-side dome member;
    a valve-side fitting end portion of the cylindrical member and an end-side fitting end portion of the cylindrical member are formed into a tapered shape such that thicknesses of the valve-side fitting end portion of the cylindrical member and the end-side fitting end portion of the cylindrical member are reduced gradually from an outer side towards an inner side of the high-pressure tank;
    a fitting end portion of the valve-side dome member fitted to the valve-side fitting end portion of the cylindrical member and a fitting end portion of the end-side dome member fitted to the end-side fitting end portion are formed into a tapered shape such that thicknesses of the fitting end portion of the valve-side dome member and the fitting end portion of the end-side dome member are gradually reduced from the inner side towards the outer side of the high-pressure tank;
    the valve-side dome member and the cylindrical member are fitted to each other in a state where the fitting end portion of the valve-side dome member is positioned on the outer side and the valve-side fitting end portion of the cylindrical member is positioned on the inner side;
    the resin intervening member has a Z-shaped section, and includes a first part, a second part and a third part;
    the first part is sandwiched between the fitting end portion of the valve-side dome member and the valve-side fitting end portion of the cylindrical member;
    the second part covers the fitting end portion of the valve-side dome member together with the first part; and
    the third part covers the valve-side fitting end portion of the cylindrical member together with the first part.

2. The high-pressure tank according to claim 1, wherein the resin intervening member is formed into a ring shape.

3. The high-pressure tank according to claim 1, wherein the resin intervening member is formed with use of a resin material that does not contain fiber.

* * * * *